United States Patent [19]
Maxson
[11] 4,397,223
[45] Aug. 9, 1983

[54] AIR DISTRIBUTOR WITH AUTOMATICALLY CLOSABLE DAMPER

[75] Inventor: Dale E. Maxson, Rockford, Ill.
[73] Assignee: Barber-Colman Company, Rockford, Ill.

[21] Appl. No.: 314,101
[22] Filed: Oct. 23, 1981
[51] Int. Cl.³ ........................ F24F 13/06; F16K 17/40
[52] U.S. Cl. ........................................ 98/40 D; 98/1; 98/41 AV; 137/75
[58] Field of Search ............... 98/1, 41 AV, 40 D, 86; 137/73, 75, 457, 468; 251/61.4, 63.6, 116

[56] References Cited

U.S. PATENT DOCUMENTS 2,673,707 3/1954 McRae ............................ 137/75 X
3,537,380 11/1970 Spradling .......................... 98/40 D
4,146,048 3/1979 McCabe ............................ 137/75

FOREIGN PATENT DOCUMENTS 204381 5/1966 Sweden ................................ 137/75

*Primary Examiner*—Albert J. Makay
*Assistant Examiner*—Harold Joyce
*Attorney, Agent, or Firm*—Leydig, Voit, Osann, Mayer & Holt, Ltd.

[57] ABSTRACT

A reciprocating pneumatic actuator moves the damper of an air diffuser between open and closed positions and is automatically vented to atmosphere if fire or high heat occurs in the vicinity of the diffuser. When the actuator is vented, the return spring of the actuator snaps the damper to its closed position. A heat responsive latch automatically holds the damper in its closed position and prevents the damper from dropping open in the event the return spring is weakened by heat.

5 Claims, 7 Drawing Figures

AIR SUPPLY
CONTROL

AIR DISTRIBUTOR WITH AUTOMATICALLY CLOSABLE DAMPER

BACKGROUND OF THE INVENTION

This invention relates generally to an air distribution unit. While the invention is applicable to various types of air distribution units, it is particularly useful in conjunction with a unit adapted to be mounted in the ceiling of a room and adapted to admit air into the room from the outlet of an air duct located above the ceiling.

In a more specific sense, the invention relates to an air diffuser in which a reciprocating pneumatic actuator moves a valve element or damper between open and closed positions relative to the outlet of the air duct. The flow of pressure fluid to the actuator preferably is controlled so as to enable the actuator to move the damper to various positions between its fully open position and its fully closed position and thus effect regulation of the volume of conditioned air delivered to the room. A typical pneumatic actuator includes slidably telescoped piston and cylinder members with one of the members being advanced by pressure fluid to open the damper and being retracted by a spring to close the damper.

In the case of fire, it is desirable to close the outlet of the duct in order to cut off the flow of air from the duct, to prevent smoke from entering the room by way of the duct and to retard heat flow from the room to the structural members above the ceiling. Automatically closable fire dampers for air ducts have existed previously. To the best of my knowledge, however, those dampers are normally held in a fully open position and are closed only in the event of fire. Such a damper is not, therefore, capable of regulating the flow of air into the room under normal conditions.

SUMMARY OF THE INVENTION

The general aim of the present invention is to provide a new and improved air distribution unit having a valve element or damper which is adapted to be moved between open and closed positions under normal conditions and which is automatically shifted to its fully closed position if fire or heat causes the temperature in the room or in the vicinity of the damper to exceed a predetermined value.

A further object of the invention is to provide a variable air volume diffuser in which a pneumatic actuator is capable of moving the damper to various open positions to modulate the air flow and serves to close the damper automatically in the case of fire or extreme heat.

A more detailed object is to achieve the foregoing by providing a unit in which heat responsive means automatically vent the actuator to atmosphere under high heat conditions so as to enable the spring of the actuator to snap the damper closed.

Still another object is to latch the damper securely in its closed position independently of the actuator spring but to effect such latching only if the damper has been moved to its closed position as a result of a high heat condition.

The invention also resides in the relative simple and inexpensive apparatus which is used to vent the actuator and to latch the damper.

These and other objects and advantages of the invention will become more apparent from the following detailed description when taken in conjunction with the accompanying drawings.

DETAILED DESCRIPTION OF THE PREFERRED EMBODIMENT

Figures 1, 2, 4:
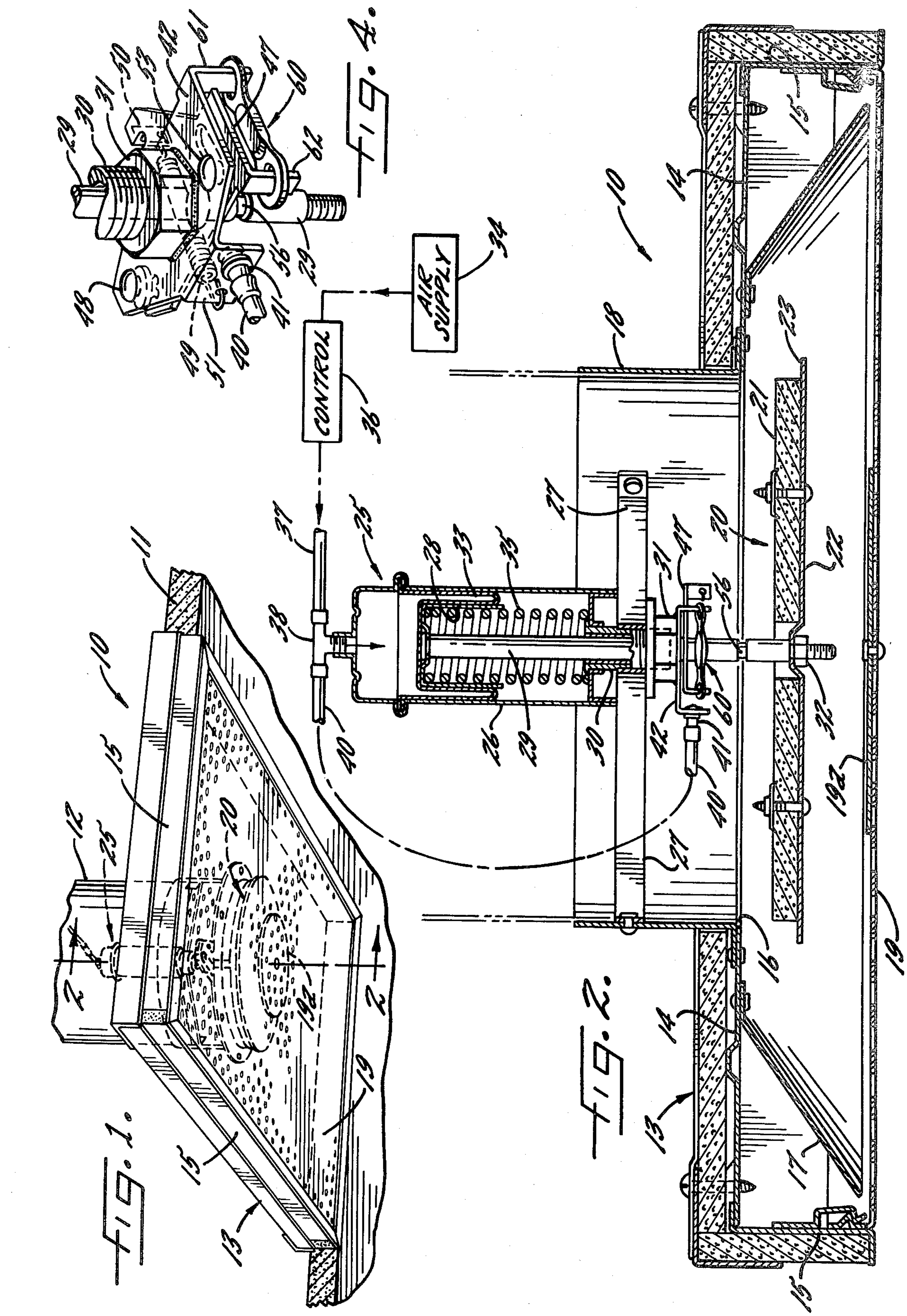
FIG. 1 is a perspective view of a new and improved air distribution unit incorporating the unique features of the present invention.
FIG. 2 is an enlarged fragmentary cross-section taken substantially along the line 2—2 of FIG. 1 and shows the damper in an open position.
FIG. 4 is a perspective view of mechanism for latching the damper in its closed position.

As shown in the drawings for purposes of illustration, the invention is embodied in an air distribution unit 10 which, in this particular instance, is adapted to be mounted in an opening in the ceiling 11 of a room and is adapted to diffuse conditioned air flowing into the room from a heating and/or cooling passage or duct 12 located above the ceiling. The ceiling which has been illustrated is of the suspended type and is located below the structural members of the building. A cavity or plenum is located between the ceiling and the structural members and defines a space which accommodates the duct, electrical conduits and the like.

Herein, the unit 10 includes a downwardly opening box 13 having a square and horizontally disposed top wall 14 (FIG. 2) and having four downwardly extending side walls 15. A circular opening 16 is formed through the center portion of the top wall 14 and is adapted to communicate with the duct 12 in order to admit a downward flow of air into the box 13. A downwardly flaring skirt 17 extends around the opening 16 and is secured to the top wall 14.

To connect the duct 12 and the box 13, an upstanding cylindrical pipe 18 (FIG. 2) is concentric with the outlet opening 16 and its lower end is fixed to the top wall 14. A grille 19 in the form of a louvered plate, a perforated screen or the like is connected to the lower margins of the side walls 15 and covers the lower end of the box 13 to effect a patterned distribution of the air flowing downwardly into the room. Secured to the center portion of the grille on the upper side thereof is a circular steel disc 19*a* which serves as a baffle to cause the air to flow horizontally and then downwardly through the grille rather than flowing in a direct downward stream.

Figure 3:
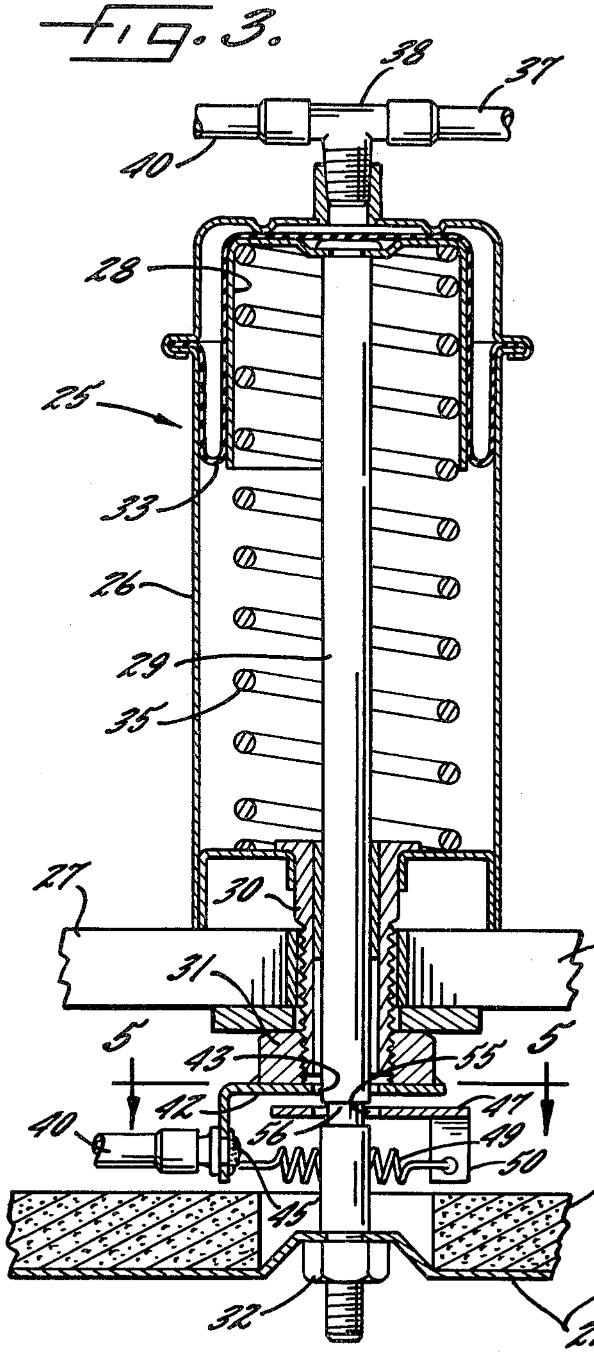
FIG. 3 is an enlarged view of parts illustrated in FIG. 2 and shows the damper in a closed position.
Figure 3:
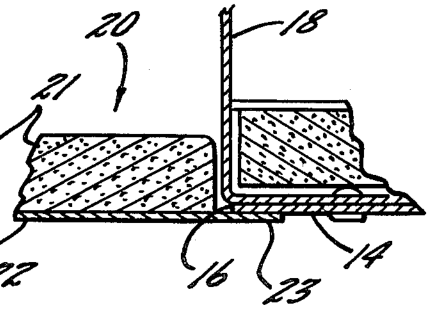

Located within the box 13 adjacent the lower end of the pipe 18 is a valve element which herein is in the form of a damper 20 (FIG. 2) adapted to open and close the outlet 16. In the present instance, the damper is formed by a comparatively thick circular top disc 21 made of sheet rock or the like and by a sheet metal bottom plate 22 whose margins extend outwardly beyond the margins of the disc and define a flange 23. When the damper 20 is in its fully closed position, the disc 21 telescopes into the pipe 18 while the flange 23 abuts the underside of the top wall 14 around the margins of the outlet 16 (see FIG. 3).

To move the damper 20 between its open and closed positions, a reciprocating pneumatic actuator 25 is supported by the box 13 and is operably connected to the damper. Herein, the actuator 25 comprises an upright cylinder member 26 whose lower end is secured to the central portion of a spider 27 (FIG. 2) having three radiating arms which are connected to the inside of the pipe 18. Telescoped slidably within the cylinder 26 is a piston member 28 (FIG. 3) carrying a depending rod 29 which is slidably guided by an externally threaded tubular fitting 30 connected to the lower end of the cylinder. A jam nut 31 is threaded onto the fitting and clamps the cylinder to the spider. Another nut 32 fastens the damper 20 to the lower end portion of the rod 29 with the damper being spaced downwardly from the nut 31.

A flexible diaphragm 33 (FIG. 3) is secured within the upper end portion of the cylinder 26 and extends across the upper end of the piston 28 so as to divide the cylinder into upper and lower chambers. When pressure fluid such as pressurized air from an air source 34 (FIG. 2) is admitted into the upper chamber, the piston 28 and the rod 29 are forced downwardly to move the damper 20 toward its open position. When air is exhausted from the upper chamber to relieve the pressure, the damper is moved toward its closed position by a coil spring 35. The spring is telescoped over the rod 29 and is compressed between the lower end of the piston and the bottom of the cylinder.

While the actuator 25 could be operated simply to move the damper 20 either to its fully open position or to its fully closed position, the damper herein is preferably adapted to be moved to any position between those two extreme positions so that the damper may act to vary the volume of air flowing into the room. For this purpose, the pressure of the air supplied to the actuator is regulated, for example, as a function of room temperature so as to cause the actuator to position the damper as required to effect delivery of an air volume sufficient to maintain a given temperature. As shown in FIG. 2, a temperature responsive control 36 is interposed between the actuator 25 and the air source 34 and regulates the pressure of the air supplied to the cylinder 26 so as to increase the pressure and effect opening of the damper 20 when a greater volume of conditioned air is required. Conversely, the control 36 allows pressurized air to exhaust from the cylinder at a controlled rate when closing of the damper is necessary to reduce the volume of conditioned air. A flexible tube 37 extends from the control 36 to a fitting 38 on the top of the cylinder and establishes communication between the air source and the cylinder by way of the control.

In accordance with the present invention, the cylinder 26 of the actuator 25 is automatically vented to atmosphere if fire or extreme heat causes the temperature adjacent the distribution unit 10 to exceed a predetermined value. As an incident to venting of the cylinder, the spring 35 automatically snaps the damper 20 to its closed position so as to shut off the flow of air and smoke into the room and to retard the flow of heat from the room to the ceiling plenum by way of the pipe 18.

Figure 6:
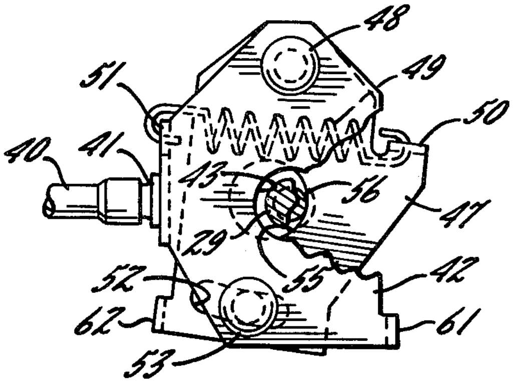
FIG. 6 is a view similar to FIG. 5 but shows the latching mechanism in a latched position.
Figure 7:
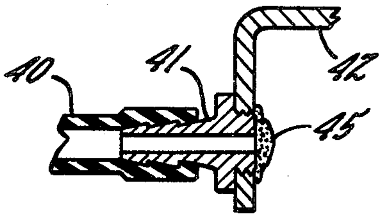
FIG. 7 is a fragmentary cross-section taken substantially along the line 7—7 of FIG. 5.

More specifically, the cylinder 26 preferably is adapted to be vented under high heat conditions by means of a flexible sensing tube 40 (FIG. 2). One end of the tube is connected to the fitting 38 and communicates with the upper chamber of the cylinder 26. The other end of the sensing tube herein is connected to the outer end of a tubular fitting 41 (FIG. 7) which is secured to a support bracket 42. The bracket 42 is welded to the underside of the jam nut 31 and is formed with an enlarged hole 43 (FIG. 6) which receives the rod 29 of the actuator 25 with substantial radial clearance.

In carrying out the invention, the inner end of the tubular fitting 41 is closed by a plug 45 (FIG. 7) of fusible or meltable material such as solder. Thus, the plug normally keeps the sensing tube 40 in a pressure-tight condition so as to enable pressurization of the cylinder 26. In the event of fire or extreme heat, however, the plug melts to open up the inner end of the tubular fitting 41 and vent the sensing tube 40 to atmosphere. As a result, the pressurized air in the upper chamber of the cylinder 26 is rapidly exhausted to atmosphere by way of the open tube and thus the spring 35 acts to snap the damper 20 upwardly to its closed position to close off the opening 16. The disc 21 of the damper preferably is made of sheet rock or other heat resistant material to help retard the flow of heat through the opening 16.

According to another feature of the invention, means are provided for positively latching the damper 20 in its closed position if the damper is moved to that position as a result of a high heat condition. By virtue of the positive latching, the damper is prevented from opening even if the temperature is sufficiently high to weaken the spring 35 and cause the spring to lose its resiliency.

In the present invention, the latching means comprise a detent in the form of a plate 47 (FIGS. 3 to 6) which is pivotally mounted on the lower side of the bracket 42 by a vertical rivet 48. The rivet supports the plate 47 for pivoting between unlatched and latched positions (FIGS. 5 and 6) with the plate being urged toward its latched position by a contractile spring 49 which is stretched between an ear 50 on the plate and an ear 51 on the bracket 42. An arcuate slot 52 (FIG. 6) is formed in the plate and receives a rivet 53 on the bracket to guide the plate for pivoting on the bracket.

Figure 5:
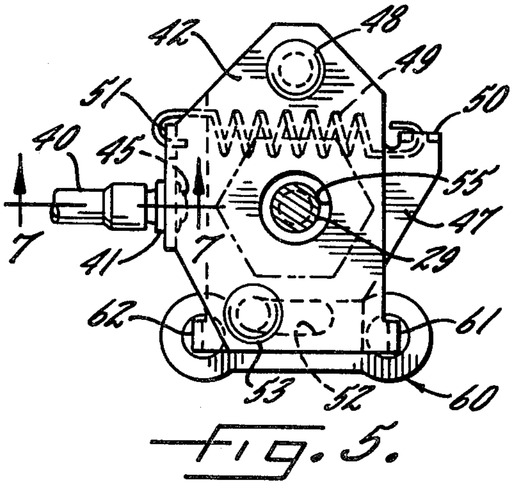
FIG. 5 is a fragmentary cross-section taken substantially along the line 5—5 of FIG. 3 and shows the latching mechanism in an unlatched position.

A vertical hole 55 (FIGS. 3 and 6) is formed through the center of the plate 47 and, when the plate is in its unlatched position shown in FIG. 5, the rod 29 of the actuator 25 may freely move upwardly and downwardly within the hole. When the plate pivots clockwise to its latched position shown in FIG. 6, the edge of the hole 55 moves into an annular groove 56 (FIG. 3) formed around the rod 29 and catches against a downwardly facing shoulder defined by the upper side of the groove.

Pursuant to the invention, heat responsive means normally hold the latching plate 47 in its unlatched position against the action of the spring 49 but release the plate to move to its latched position in the event of fire. In this instance, the heat responsive means comprise a fusible link 60 (FIGS. 4 and 5) formed with holes which receive a tab 61 on the bracket 42 and a tab 62 on the plate 47. The link normally is rigid and prevents the spring 49 from pivoting the plate to its latched position. Thus, the rod 29 normally may freely move up and down within the opening 55 and may shift the damper 20 between its fully open and fully closed positions without interference from the latching plate. When fire or high heat occur, however, the link 60 melts so as to permit the spring 49 to move the plate 47 to its latched position. If the damper 20 already has been moved to its closed position by the spring 35, the edge of the hole 55 in the plate 47 immediately moves into the groove 56 in the rod 29 and catches the upper side of the groove to positively latch the damper. If the link 60 melts before the sensing tube 40 has been vented, the plate 47 pivots until the edge of the hole 55 engages the side of the rod 29 and then pivots further to move the edge of the hole into the groove 56 once the rod has been fully retracted. In either case, the damper is securely latched against returning to its open position if the heat reduces or destroys the effectiveness of the spring 35.

From the foregoing, it will be apparent that the present invention brings to the art an air distribution unit 10 with a new and improved actuator 25 for automatically closing the damper 20 under high heat conditions. While the actuator has been specifically shown and described in conjunction with a variable air volume diffuser, those familiar with the art will appreciate that the actuator could be used equally well with other air distribution units (e.g., terminal units, mixing units, side wall diffusers and the like) for automatically closing a damper or other valve element with respect to an air outlet or passage.

I claim:

1. An air distribution unit comprising means defining an air passage, a valve element movable between open and closed positions with respect to said passage, and means for moving said valve element between said positions, said moving means comprising slidably telescoped piston and cylinder members, one of said members being operably connected to said valve element, means for admitting pressure fluid into said cylinder member and for exhausting pressure fluid from said cylinder member, said one member moving said valve element toward said open position when pressure fluid is admitted into said cylinder member, a spring acting on said one member and operable to cause said one member to move said valve element toward said closed position when pressure fluid is exhausted from said cylinder member, the improvement in said air distribution unit comprising, a sensing tube communicating with said cylinder member and normally pressurized by said pressure fluid, first heat responsive means associated with said sensing tube and operable to vent said sensing tube to atmosphere when the temperature adjacent said heat responsive means exceeds a predetermined value whereby the pressure fluid in said cylinder member is exhausted to atmosphere by way of said sensing tube so as to enable said spring to move said valve element to said closed position, a detent movable between latched and unlatched positions relative to said valve element, biasing means urging said detent to said latched position, and second heat responsive means normally holding said detent in said unlatched position against the action of said biasing means and operable to permit said detent to move to said latched position when the temperature adjacent said second heat responsive means exceeds a predetermined value thereby to enable said detent to hold said valve element in said closed position independently of said spring.

2. An air distribution unit as defined in claim 1 in which one end of said sensing tube communicates with said cylinder member and in which the opposite end of said sensing tube is located in the vicinity of said valve element, said first heat responsive means comprising a plug normally closing said opposite end of said tube to atmosphere and adapted to melt when said temperature exceeds said predetermined value.

3. An air distribution unit as defined in claim 1 in which a rod is connected to said piston member and in which said valve element is a damper connected to said rod, a shoulder on said rod, said detent comprising a plate adapted to catch said shoulder when said plate is in said latched position and said damper is in said closed position, a support mounting said plate to move between said latched and unlatched positions, said biasing means being connected between said support and said plate, and said second heat responsive means comprising a fusible link connected between said support and said plate and normally holding said plate in said unlatched position.

4. An air distribution unit as defined in claim 3 in which said shoulder is defined by one side of an annular groove formed in said rod, said plate being formed with a hole which slidably receives said rod when said plate is in said unlatched position, an edge portion of said hole being located in said groove and catching said shoulder when said plate is in said latched position and said damper is in said closed position.

5. A variable air volume diffuser comprising means defining an air outlet, a damper movable between open and closed positions with respect to said outlet, and means for moving said damper between said positions, said moving means comprising a cylinder, a piston slidably mounted within said cylinder and operably connected to said damper, means for admitting a regulated flow of pressure fluid into said cylinder and for exhausting pressure fluid from said cylinder, said piston moving said damper toward said open position when pressure fluid is admitted into said cylinder, a spring acting on said piston and operable to cause said piston to move said damper toward said closed position when pressure fluid is exhausted from said cylinder, the improvement in said diffuser comprising, a sensing tube communicating with said cylinder and normally pressurized by said pressure fluid, first heat responsive means associated with said sensing tube and operable to vent said sensing tube to atmosphere when the temperature adjacent said heat responsive means exceeds a predetermined value whereby the pressure fluid in said cylinder is exhausted to atmosphere by way of said sensing tube so as to enable said spring to move said damper to said closed position, a detent movable between latched and unlatched positions relative to said damper, biasing means urging said detent to said latched position, and second heat responsive means normally holding said detent in said unlatched position against the action of said biasing means and operable to permit said detent to move to said latched position when the temperature adjacent said second heat responsive means exceeds a predetermined value thereby to enable said detent to hold said damper in said closed position independently of said spring.

* * * * *